Oct. 3, 1933.    W. SCHÄFFER    1,928,765
METHOD AND MEANS FOR WAVE MEASUREMENT
Filed Sept. 19, 1928
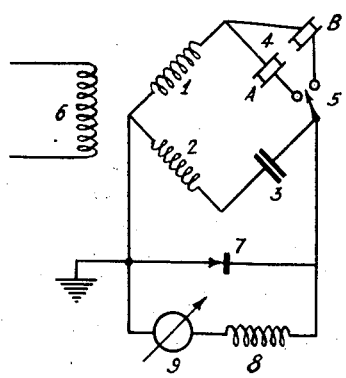
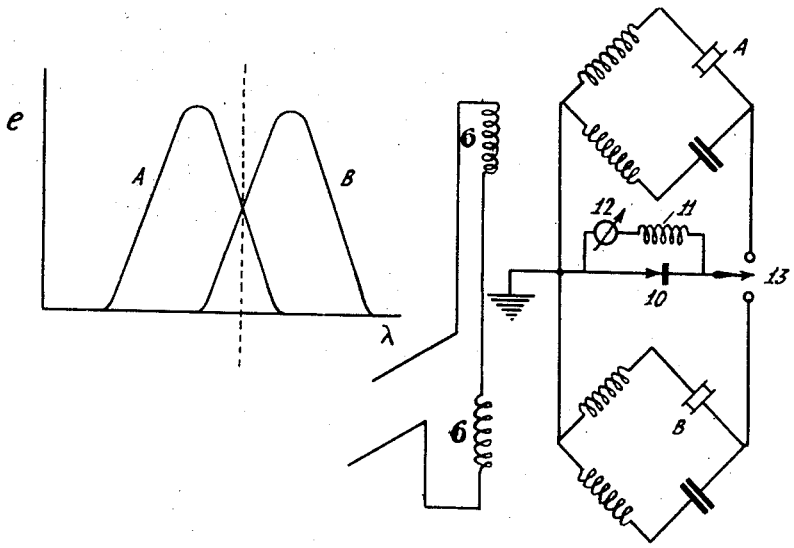
INVENTOR
WALTER SCHÄFFER
BY
ATTORNEY Patented Oct. 3, 1933

1,928,765

UNITED STATES PATENT OFFICE 1,928,765

METHOD AND MEANS FOR WAVE MEASUREMENT

Walter Schäffer, Berlin, Germany, assignor to Telefunken Gesellschaft für Drahtlose Telegraphie m. b. H., Berlin, Germany Application September 19, 1928, Serial No. 306,907, and in Germany July 30, 1927

6 Claims. (Cl. 250—39)

Mechanical oscillators such as quartz crystals are used in a great number of ways and circuit arrangements for the purpose of measuring the wave length or frequency of radio frequency oscillations. Quartz type wave-meters of the kind evolved by Giebe have, inter alia, proved very serviceable in practice. In these wavemeters a crystal is confined inside a vacuous space or a space filled with rare gases, and opposite the crystal electrodes are mounted. The crystal may be connected in any suitable manner to the transmitter whose wave-length is to be ascertained.

If the wave-length of the transmitter coincides with the natural wave-length of the crystal, a luminous phenomenon is set up at the crystal by the action of piezo-electric forces. The determination of the wave-length will be so much sharper the looser the coupling with the transmitter. Although the resonance curve of the quartz is comparatively marked or sharp, it is nevertheless a fact that the luminous action occurs over a certain width, i. e., inside the points of the resonance curve within which the ignition potential is comprised. It is evident that the width of the luminous action in dependence upon the detuning is so much larger, the closer the coupling between the quartz resonator and the transmitter whose wave-length is to be measured.

This involves a certain drawback whenever particularly exact measurements are to be made, as is true, for example, of the case where two transmitters independently of each other generate oscillations, and where both transmitters are to be employed for "equi-wave" telephony.

In such accurate measurements it is observed that the quartz crystals when oscillating with an unduly large amplitude, are subject to changes in their natural wave-length on account of the temperature fluctuations associated therewith. It is, finally, also extremely difficult to grind or polish a quartz crystal so accurately that its natural wave-length turns out to be of the very value that is desired. The waste or scrap resulting from an attempt to make, say, two quartz crystals of exactly the same wave-length is very large, indeed, it is hardly possible at all to grind them with such accuracy. Now, these three drawbacks may be obviated by means of the following arrangement:

To measure a wave-length, two quartz crystals instead of only one crystal are used, said crystals being ground in such a manner that the desired wave is located between them. Each of these quartz crystals is separately coupled with the transmitter to be measured in such a way that the desired wave happens to be located just at the intersection of the branches of the two resonance curves, the coupling in this scheme being again chosen so close that both crystals will just not exhibit luminous phenomena in this condition. Under these circumstances, the measuring accuracy or sharpness, fundamentally, is of any possibly desired degree of exactness. Since the quartz crystals in this particular state oscillate only with a relatively small amplitude, the incidental temperature rise due to the oscillations is very small.

Finally, the accurate grinding of the crystals is then a minor consideration inasmuch as inside certain limits, correction of the measurement is possible by coupling one of the crystals more closely than the other, with the result that the point of intersection of the resonance-curve branches is shifted. One particular additional advantage of this scheme is that whenever the transmitter deviates from its nominal or rated wave-length, it is possible to tell at once in which sense such alteration has taken place, in other words, whether the wave of the transmitter has grown or has decreased; namely, from the fact that either the one or the other of the two quartz crystals starts to luminesce.

So far as the principle underlying this measuring scheme is concerned it is immaterial in what way these quartz crystals have been formed, in other words, whether they work with a luminous action as in the Giebe device, or whether they cooperate in some other manner, for instance, with a detector or a Deprez instrument, or in some other known manner.

In what follows a circuit arrangement is disclosed which likewise comprises two oscillators whose natural wave-lengths are a small distance apart, and in which the nominal or rated wave-length is to be located between the natural waves of the two crystals. That is, two crystals are utilized having overlapping resonance curves. The frequency at their intersection is the frequency to be dealt with, the two crystals being adapted to be alternately connected into circuit so that when the desired frequency is maintained in an electrical circuit, the response of either crystal placed into cooperation with the aforementioned electrical circuit is the same.

In the accompanying drawing:

Fig. 1 shows one way in which a bridge circuit may be utilized for carrying out my invention;

Fig. 2 illustrates resonance curves of the crystals or mechanical oscillators shown in Fig. 1; and, Fig. 3 illustrates another manner of carrying out my invention by the utilization of bridge circuits.

In Fig. 1 recourse is had to a bridge scheme wherein two arms of the bridge 1 and 2 consist of self-inductances of equal value, while arm 3 consists of a condenser and arm 4 consists of either one of two mechanical oscillators or crystals A and B, the same being alternately connected in the bridge by the aid of the change-over switch 5. The brige arrangement is excited by means of the coupling coil 6. The diagonal contains the detector 7, and in parallel thereto there is connected a Deprez indicating instrument 9 by way of radio frequency choke-coil 8.

That is, the instrument is effectively across one pair of conjugate points on the bridge and the source of energy whose frequency is to be measured is effectively coupled across another pair of conjugate points or opposite corners of the bridge.

The bridge arrangement is chosen so as to disconnect the potential exciting the mechanical oscillator or crystal from the detector. Across the diagonal of the same, that is, at the points of connection of the detector, the potential is to be of zero value. The piezo-electric potential at the crystals, which, as is well known, presents a phase displacement angle of 90 degrees with reference to the exciting potential, comes to act upon the detector integrally.

The novel feature of the bridge scheme here disclosed resides in the use of a plurality, that is, two mechanical oscillators or crystals, the resonance curves of which are illustrated in Fig. 2, the abscissæ giving the wave-lengths and the ordinates the potentials (e) that arise. If the nominal or rated wave is situated at the point of intersection of the two resonance curves which as desired may be either wave length or frequency the deflection of instrument 9 will be the same regardless of which one of the two crystals is connected in arm 4 by the change-over switch 5. But even a minute deviation of the rated wave will cause the indication by instrument 9 of a larger or smaller value, if the switch 5 connects either one of the two crystals in the bridge arm, according to whether the wave to be measured deviates from the rated value in one direction or the other.

The accuracy of measurement is extremely high, indeed, even with an instrument of not very high sensitiveness it is readily possible to read discrepancies of one-millionth or even less with great clearness.

In order that the bridge arrangement may be balanced in capacitive regard for each one of the two crystals connected in arm 4 by the aid of the condenser connected in arm 3, different methods may be applied. Either a condenser may be connected in parallel from the outset to each of the two crystals in such a way that the capacity to be compensated of each of the crystals is of equal size, with due regard to the conveniently large condenser connected in parallel or else balanced condition may be realized by the aid of combinations of series and parallel capacities. It may be desirable to shift the point of intersection of the two resonance curves somewhat, and this is attainable by making the coupling of either one of the two crystals more or less loose or close. Also this end may be accomplished by the use of series and parallel condensers.

Fig. 3 illustrates a circuit arrangement which differs from the one shown in Fig. 1 only by that, for each of the two crystals to be used, a separate bridge arrangement is provided. In parallel connection with the detector 10 there is again provided a suitable indicator such as a Deprez indicating instrument 12 in series with a choke-coil 11. The change-over of the detector system with instrument may be effected by the aid of the switch 13 to either one of the two crystals.

The bridges A and B are excited by coupling coils 6, 6 which are serially supplied with energy as shown.

The measuring method here described offers two essential advantages. One advantage is that the measuring accuracy will not be impaired if the detector should happen to change its sensitiveness, for independently of the sensitiveness of the detector, in the presence of the correct wave-length, the deflection of instrument 9 or 12 must remain the same on changing over from one oscillator to the other, regardless of what the absolute value may be.

The other advantage which this arrangement offers compared with other wave-length measuring methods consists in that, for determining whether the existant wave actually is the rated or nominal wave or not, it is not necessary to bring about a detuned state in order to pass through the resonance curve. For if the measurements are made only with a crystal or with a tuned circuit, all that can be told is whether the resonance point is present, namely, by that detuning is produced while the behavior of the measuring instrument is kept under observation.

Contradistinct thereto, in the present method and arrangement, all that is required is to effect the change-over by the agency of switch 5 or 13, respectively, and it is then possible to determine, without the necessity of effecting a detuned condition, whether the wave-length or frequency present is equal to the rated wave or frequency, and if not, whether it is greater or smaller.

I claim as my invention:

1. A pair of bridge circuits, a resonator in an arm of each bridge circuit, said resonators having overlapping resonance curves, and means for connecting an indicating device alternately across each bridge.

2. A pair of bridge circuits, a piezo-electric resonator in an arm of each bridge circuit, said resonators having overlapping resonance curves, and means for connecting an indicating device alternately across each bridge.

3. An arrangement for frequency indication comprising in combination, a bridge circuit having two pairs of arms, a pieze-electric crystal frequency standard connected in one of said arms, means for coupling a source whose frequency is to be measured to said bridge, and, an indicating device also coupled to said bridge for indicating variations in frequency of said source.

4. An arrangement for frequency indication comprising in combination, a first bridge circuit having two pairs of arms, a second bridge circuit having two pairs of arms, a piezo-electric crystal frequency standard connected in one arm of each of said first and said second bridge circuits, means for coupling a source whose frequency is to be measured across conjugate points in said bridge circuits, and means selectively to couple an indicating device across a pair of points in either of said bridge circuits which is conjugate to the points across which the frequency source is coupled.

5. In a piezo-electric frequency measuring device, a piezo-electric crystal resonator, means to impress a current whose frequency is to be measured upon said crystal, an indicating device, and means to prevent the said current from acting directly upon said device, said means comprising a bridge circuit including said piezo-electric crystal resonator connected between said first mentioned means and said device.

6. An arrangement for frequency indication comprising, in combination, a bridge circuit having three arms serially connected, and a fourth arm comprising a plurality of piezo-electric crystals each having terminals, one terminal of each of said crystals being connected to one end of said series connection, and a switch for selectively connecting one of the other terminals of one of said crystals to the other end of the series connection, means for coupling a source whose frequency is to be measured to said bridge, and an indicating device also coupled to said bridge for indicating variations in frequency of said source.

WALTER SCHÄFFER.